United States Patent [19]

Yamada

[11] Patent Number: 4,826,057
[45] Date of Patent: May 2, 1989

[54] CARRIER FOR A VEHICLE

[75] Inventor: Kouzou Yamada, Saitama, Japan

[73] Assignee: Honda Giken Kogyo Kabushiki Kaisha, Tokyo, Japan

[21] Appl. No.: 8,106

[22] Filed: Jan. 23, 1987

Related U.S. Application Data

[63] Continuation of Ser. No. 741,135, Jun. 4, 1985, abandoned.

[30] Foreign Application Priority Data

Jun. 4, 1984 [JP] Japan ............... 59-82704[U]

[51] Int. Cl.$^4$ .................................................. B60R 9/10
[52] U.S. Cl. .................... 224/32 A; 180/215; 224/42.11; 224/42.31; 224/42.44
[58] Field of Search ............... 224/273, 42.42, 32 R, 224/42.45 R, 30 R, 32 A, 275, 42.11, 42.31, 42.44; 280/153 R, 160, 769, 289 G, 289 A, 202; 180/210, 215; 296/3, 198

[56] References Cited

U.S. PATENT DOCUMENTS

| | | | |
|---|---|---|---|
| 2,809,053 | 10/1957 | Pletscher | 224/39 |
| 4,176,771 | 12/1979 | Dubroc, Sr. | 224/39 |
| 4,247,030 | 1/1981 | Amacker | 224/273 |
| 4,325,448 | 4/1982 | Pivar | 180/210 X |
| 4,325,562 | 4/1982 | Yamada | 280/289 A X |
| 4,416,348 | 11/1983 | Fukui | 180/210 |
| 4,449,602 | 5/1984 | Dittmann | 280/282 X |
| 4,593,782 | 6/1986 | Nabusawa | 180/215 |

FOREIGN PATENT DOCUMENTS 58-108984 1/1982 Japan .
58-122673 2/1982 Japan .

Primary Examiner—Renee S. Luebke
Attorney, Agent, or Firm—Lyon & Lyon

[57] ABSTRACT

A carrier for a three-wheel vehicle having a frame which is pivotally mounted to the frame of the vehicle. Fenders are resiliently mounted to the carrier such that pivotal movement of the carrier will result in the fenders moving therewith. A subcarrier frame is in turn pivotally mounted to the carrier frame for pivotal movement of the subcarrier frame relative to the carrier frame. An articles case located beneath the carrier and specifically beneath the subcarrier frame is positioned between the rear wheels of the tricycle structure. A cover for the articles case is fixed to the subcarrier frame such that pivotal movement of the subcarrier frame will result in opening of the articles case.

3 Claims, 4 Drawing Sheets

CARRIER FOR A VEHICLE

This application is a continuation of application Ser. No. 741,135, filed June 4, 1985, now abandoned.

BACKGROUND OF THE INVENTION

The field of the present invention is carriers for small vehicles.

Carriers have been employed on small vehicles for the lashing of goods to the vehicle for transportation. Such carriers often include a frame structure of tubular material fixed to the frame of the vehicle. Such carriers are often located behind the rider to extend across the upper rear portion of the vehicle.

Such carriers have been developed for three-wheel vehicles. One such carrier is disclosed in Japanese Patent Publication No. 58-122673. In this carrier, the carrier frame is attached near the middle thereof to the main frame of the vehicle by brackets. Stays extend upwardly and outwardly from the frame to fenders. The carrier and the fenders are then bolted together and to the carrier stays. Such an arrangement couples the carrier to the fenders and rigidly fixes this assembly to the vehicle frame. To gain access beneath the fenders in such an arrangement requires the disassembly of the carrier from the brackets.

Another carrier is illustrated in Japanese Patent Publication No. 58-108984. In this device, a carrier is again fixed to the rear of a three-wheel vehicle. A subcarrier frame is provided in this carrier which is pivotally mounted to the main carrier frame such that it may be rotated to expose an articles case and the lid therefor. Once having rotated the subcarrier frame, the articles case and lid are exposed such that the lid may then be removed from the articles case.

SUMMARY OF THE INVENTION

The present invention is directed to a carrier for a small vehicle. The mounting of the carrier relative to the frame and components of the vehicle provide improvements and advantages over earlier carrier structures.

In a first aspect of the present invention, a carrier frame is pivotally mounted to the vehicle frame. Attachment between the carrier and underlying fenders of such a structure may provide resilient support between the carrier frame and the fenders and allow the carrier and fenders to be raised for full access to the underlying mechanism.

In another aspect of the present invention, a subcarrier frame is pivotally mounted to the carrier frame of the vehicle. The subcarrier frame may be pivoted to expose an articles case located thereunder. The lid of the articles case is fixed to the subcarrier frame such that opening of the subcarrier frame may in turn open the articles case in a single motion.

Thus, access may be improved to either or both of the mechanisms underlying the rear body of the vehicle and the articles case underlying a portion of the carrier assembly. Accordingly, it is an object of the present invention to provide improved vehicle carriers. Other and further objects and advantages will appear hereinafter.

DETAILED DESCRIPTION OF THE PREFERRED EMBODIMENT

Figure 1:
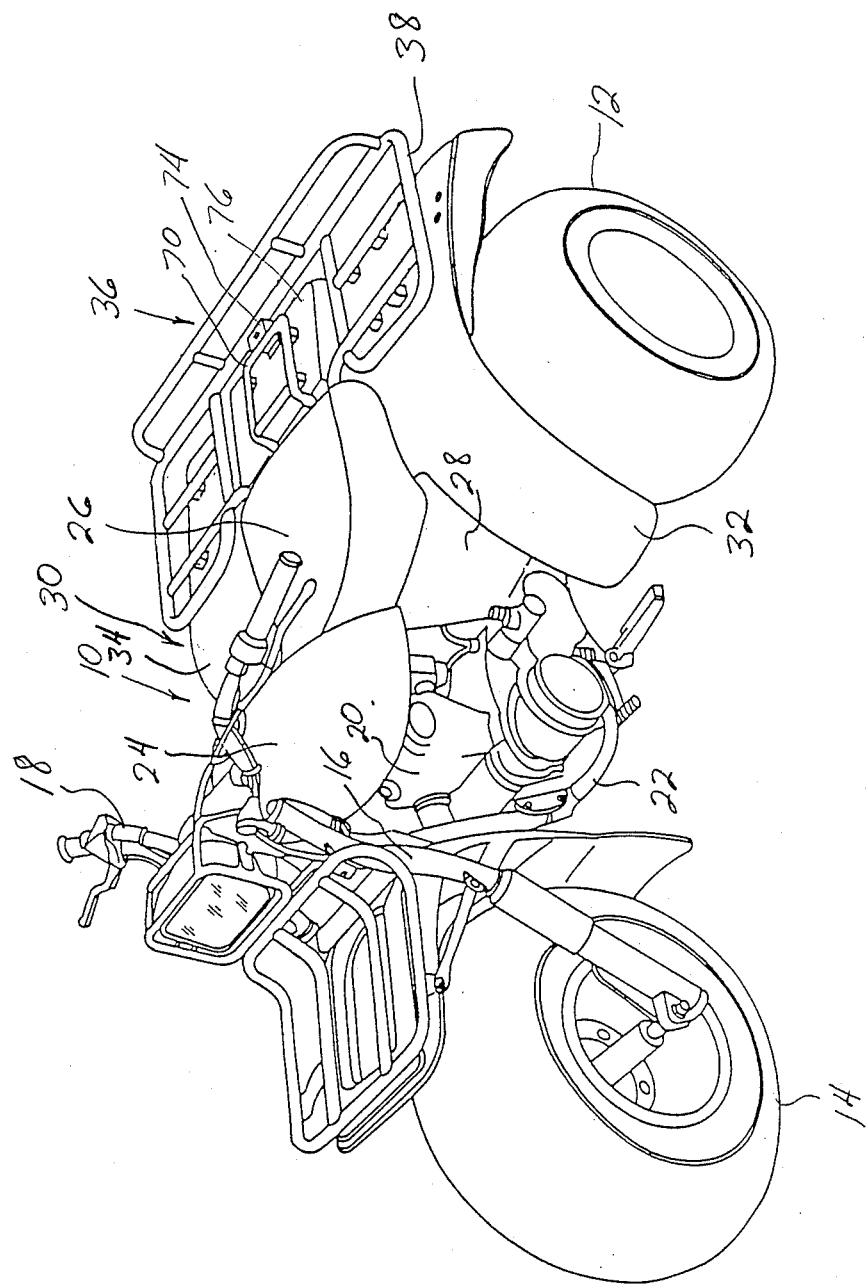
FIG. 1 is an oblique view of a small vehicle employing a carrier of the present invention.

Turning in detail to the drawings, a vehicle, generally designated 10, is illustrated. The vehicle is of a tricycle type having two rear wheels 12 and a front wheel 14. The front wheel is mounted on a front fork 16 controlled by handlebars 18. The vehicle is powered by an engine 20 located within a frame structure 22. The vehicle further includes a fuel tank 24, a seat 26, side covers 28 and a vehicle body generally designated 30. The vehicle body 30 generally includes rear fenders 32 and 34.

Figure 3:
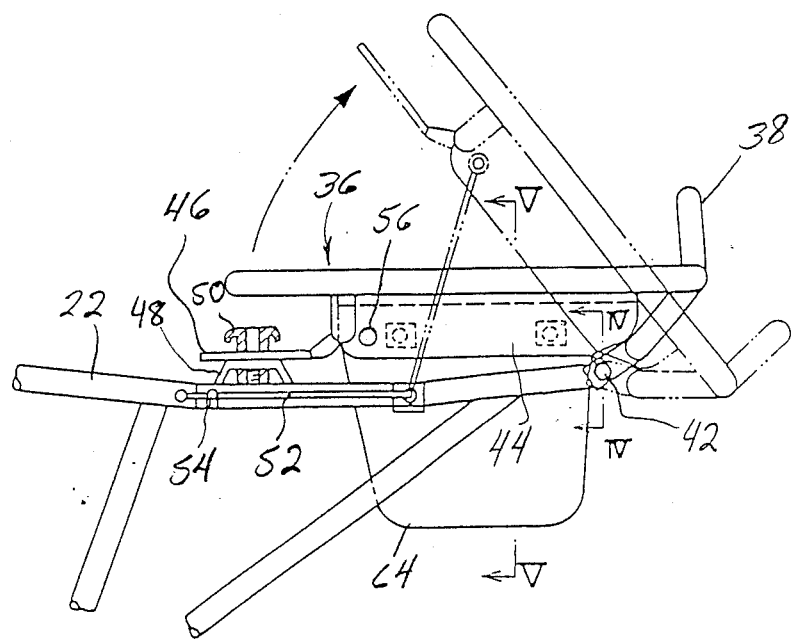
FIG. 3 is a side view of the central frame of the vehicle with the embodiment of FIG. 1 located thereon.

Located across the vehicle body 30 rearwardly of the seat 26 is a carrier, generally designated 36 in FIG. 1. The carrier 36 includes a tubular carrier frame 38 which extends laterally across the vehicle to provide a mounting surface to which may be lashed articles for transportation on the vehicle. As can best be seen in FIG. 3, means are provided on the vehicle frame 22 for pivotally mounting the carrier frame 38 thereto. The carrier frame 38 is illustrated in full line in its normal position for use and in phantom line in its raised position for access to areas of the vehicle beneath the carrier.

Figure 4:
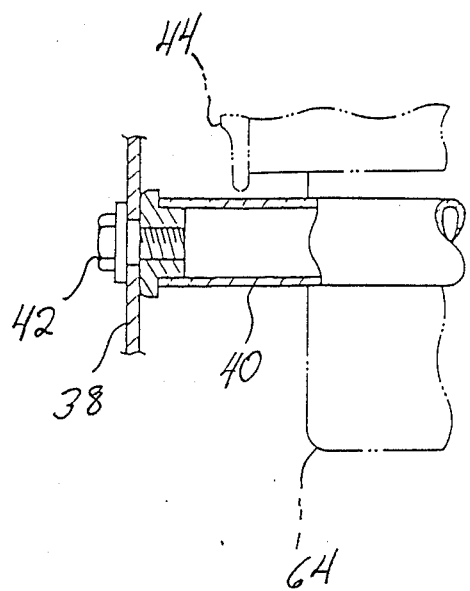
FIG. 4 is a cross-sectional detail view taken along line IV–IV of FIG. 3.
Figure 5:
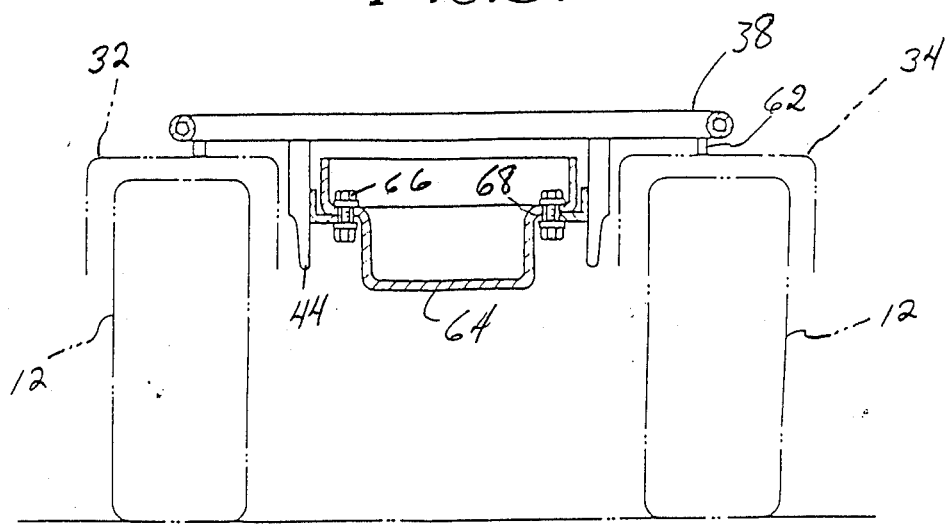
FIG. 5 is a cross-sectional end view taken along line V—V of FIG. 3.

The vehicle frame 22 extends rearwardly to a convenient location adjacent the rear end of the vehicle. A cross pipe 40, as seen in FIG. 4, extends across the rear portion of the vehicle to provide a mechanism for mounting the carrier 38. A bolt 42 holds one element of the carrier frame 38 such that it may be pivotally rotated relative to the frame 22. A similar attachment is provided at the other end of the cross pipe 40. Guide plates 44 extend downwardly to either side of an articles case described below.

At a distance from the pivot through bolts 42 on the carrier frame 38 is a bracket 46 which is fixed to the carrier frame 38. The bracket 46 extends to a mounting bracket 48 such that a bolt 50 may cooperate with the mounting bracket 48 to rigidly retain the carrier bracket 46 in place. With the bolt 50 removed, the carrier frame 38 may be pivoted as shown in phantom in FIG. 3. A rod 52 is pivotally fixed to the frame 22 and may be retained in a bracket 54 at the free end thereof. The rod 52 may be swung to couple with an attachment point 56 on the carrier structure with the carrier structure in the pivoted condition.

Figure 2:
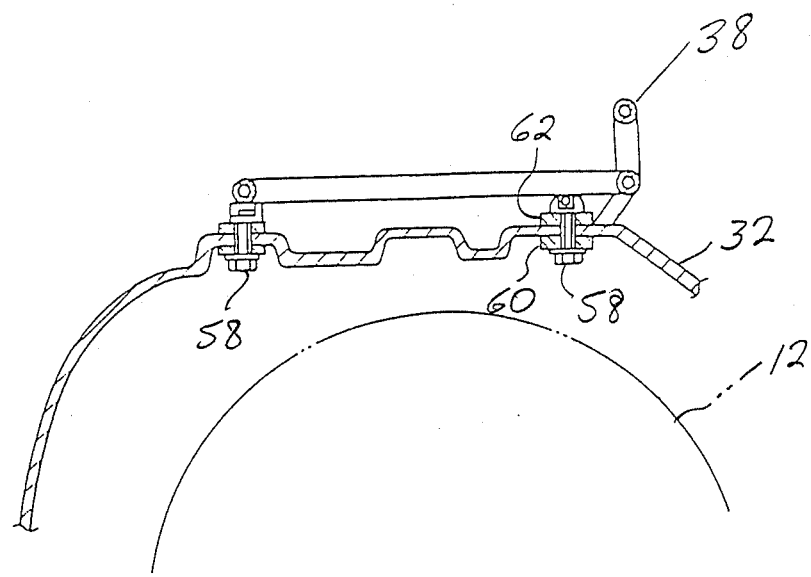
FIG. 2 is a cross-sectional side view of the embodiment illustrated in FIG. 1.

Looking to FIG. 2, the attachment of the carrier frame 38 to one of the fenders 32 is illustrated. This attachment is accomplished by resilient mounts including fasteners such as bolts 58. The bolts 58 are coupled with the carrier frame and the fenders as can be seen in FIG. 2 and employ resilient elements between the fasteners and the fenders to accomplish the resilient mounting. The resilient elements include collars 60 located about the bolts 58 on one side of the fender 32 and mounts 62 located on the other side of the fender 32. The collar 60 and mount 62 are preferably of a rubber material.

Located centrally between the wheels 12 is an article case 64 attached by means of bolts 66 through collars 68. The article case 64 includes a convenient and protected cavity for the placement of articles as may be desired by the operator. The article case 64 is shaped conveniently to avoid other mechanisms of the vehicle and to provide clearance, if necessary, to the rear axle.

Figure 6:
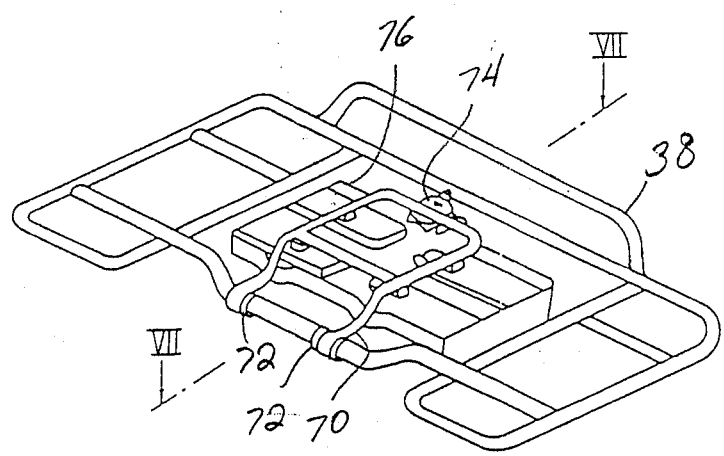
FIG. 6 is an oblique view of the carrier of the embodiment of FIG. 1.
Figure 7:
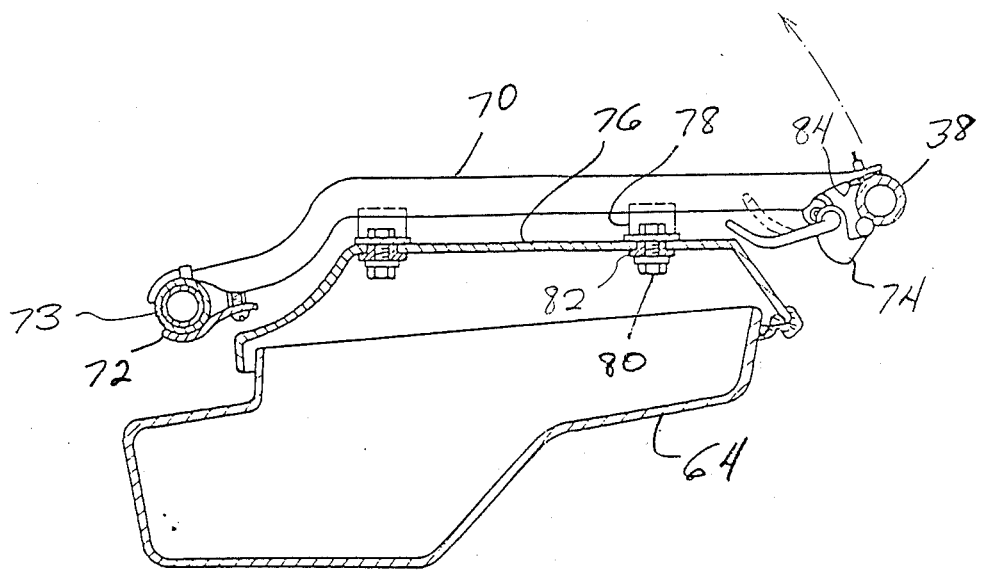
FIG. 7 is a cross-sectional view taken along line VII—VII of FIG. 6.

Looking specifically to FIGS. 6 and 7, the carrier frame 38 is illustrated as including a subcarrier frame 70. The subcarrier frame 70 may also be conveniently tubular in construction and centrally located within the carrier frame 38. Brackets 72 pivotally mount the subcarrier frame 70 about a forward cross member of the carrier frame 38. A bushing 73 enhances pivotal movement between the elements. The subcarrier frame 70 then extends rearwardly on the vehicle to provide maximum access from the rear of the vehicle. A lock mechanism 74 fixed to the subcarrier frame 70 such that the mechanism engages the carrier frame 38 can prevent opening of the subcarrier frame 70 without a key.

The articles case 64 includes a lid 76 which extends over and around the upper lip of the articles case 64. This lid 76 is attached by means of brackets 78 to the subcarrier frame 70. Bolts 80 extend to the mounts 78 through the lid 76 with resilient collars 82 therebetween to reduce the transmission of vibration and the like. A cushion 84 also of resilient material such as rubber further acts to isolate vibration in the assembly. Thus, with the actuation of the subcarrier frame 70, the lid 76 of the articles case is raised simultaneously. The lock mechanism 74 fixed to the sturdy frame structures 70 and 38 can thus provide a secure closure for the articles case.

Thus, an improved carrier structure is disclosed providing greater convenience and access. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An apparatus for use on a vehicle having a vehicle frame, a seat, two oppositely spaced rear wheels having fenders thereover and an article case disposed rearwardly of said seat and intermediate said rear wheels, comprising in combination:
   a carrier having a carrier frame positioned above said rear wheels and behind said seat;
   mounting means for pivotally attaching said carrier frame to said vehicle frame, said mounting means attaching said carrier frame at a rear portion thereof for upward and rearward displacement of said carrier frame about a horizontal axis perpendicular to the longitudinal axis of said vehicle;
   resilient mounts on said carrier frame attaching said fenders to said carrier frame from displacement therewith;
   a carrier bracket attached to, and extending forwardly of, said carrier frame and being securable to said vehicle frame by a releasable fastener;
   a subcarrier frame pivotally mounted to a forward portion of said carrier frame and having means for releasable attachment to said rear portion of said carrier frame; and
   a top for closing said article case secured to said subcarrier frame for removal from said article case upon pivotal displacement of said subcarrier frame.

2. The apparatus of claim 1 wherein said resilient mounts include fasteners coupled with said carrier frame and the fenders and resilient elements between said fasteners and the fenders.

3. The combination of claim 1 wherein said carrier bracket is forwardly displaced from said mounting means for releasable attachment to said vehicle frame.

* * * * *